No. 868,632. PATENTED OCT. 22, 1907.
G. A. ALMSTROM & P. CHRISTENSON.
MECHANISM FOR DISPENSING EGGS AND OTHER COMMODITIES.
APPLICATION FILED DEC. 4, 1906.
3 SHEETS—SHEET 1.
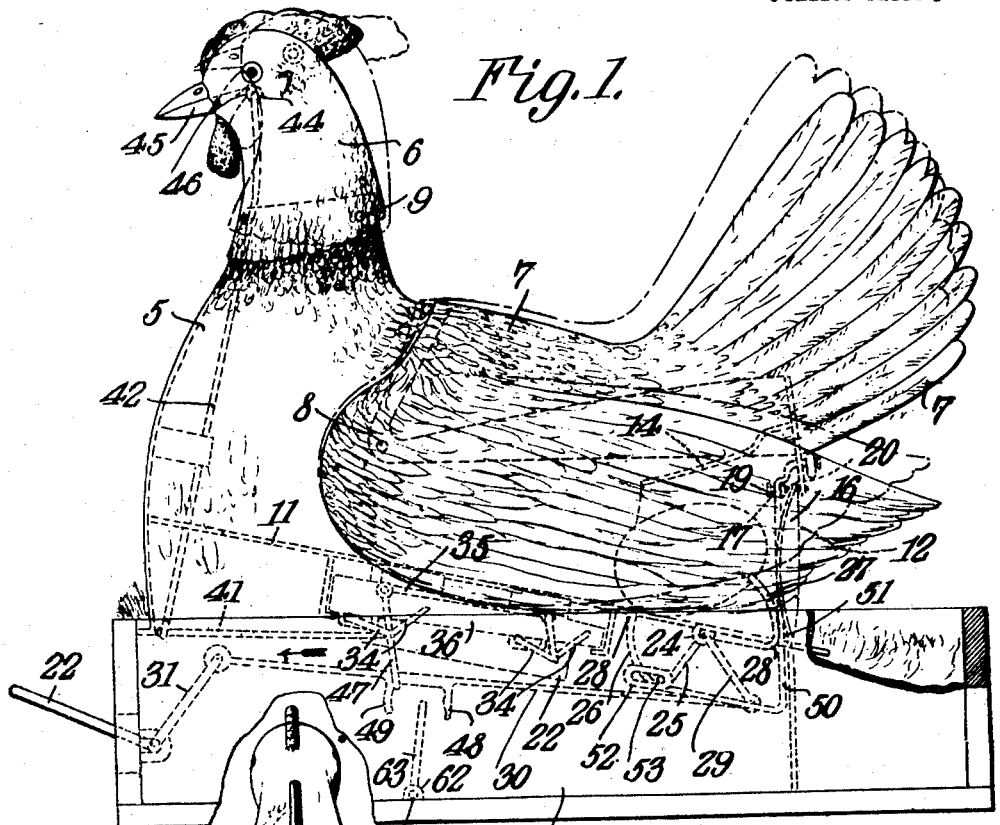
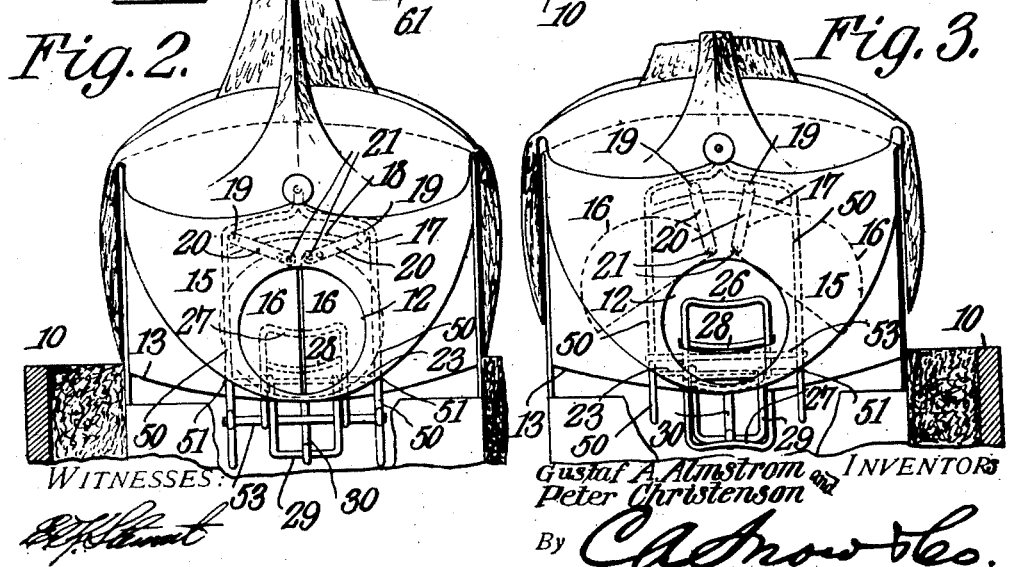
WITNESSES:
Gustaf A. Almstrom
Peter Christenson
INVENTORS
By C. A. Snow & Co.
ATTORNEYS

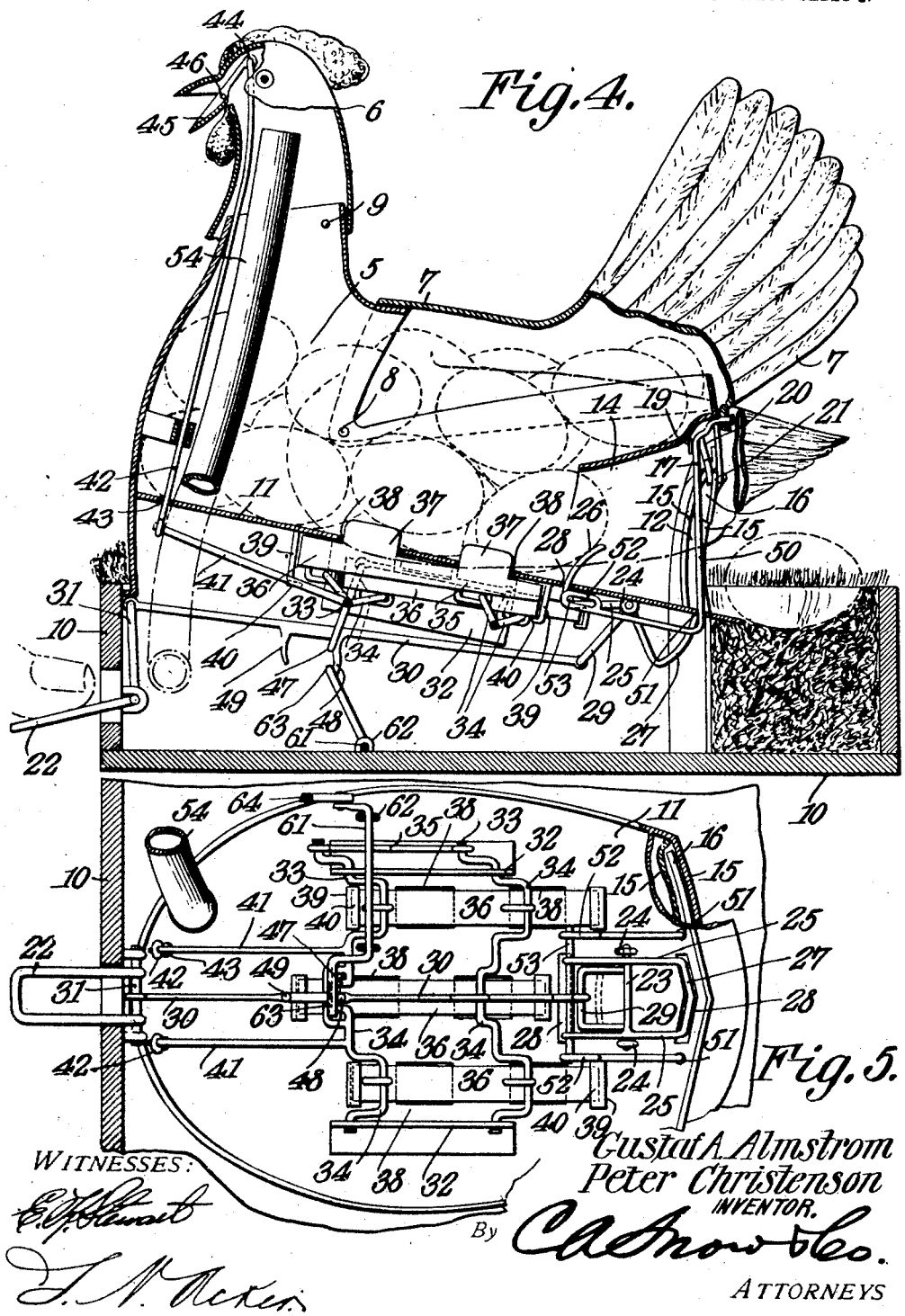

No. 868,632. PATENTED OCT. 22, 1907.
G. A. ALMSTROM & P. CHRISTENSON.
MECHANISM FOR DISPENSING EGGS AND OTHER COMMODITIES.
APPLICATION FILED DEC. 4, 1906.

3 SHEETS—SHEET 3.

WITNESSES:

Gustaf A. Almstrom and
Peter Christenson
INVENTORS

By C. A. Snow & Co.
ATTORNEYS

UNITED STATES PATENT OFFICE.

GUSTAF A. ALMSTROM AND PETER CHRISTENSON, OF NORTHPORT, WASHINGTON.

MECHANISM FOR DISPENSING EGGS AND OTHER COMMODITIES.

No. 868,632.   Specification of Letters Patent.   Patented Oct. 22, 1907.

Application filed December 4, 1906. Serial No. 346,293.

*To all whom it may concern:*

Be it known that we, GUSTAF A. ALMSTROM and PETER CHRISTENSON, citizens of the United States, residing at Northport, in the county of Stevens and State of Washington, have invented a new and useful Mechanism for Dispensing Eggs and other Commodities, of which the following is a specification.

This invention relates to mechanism for dispensing eggs and other commodities.

The object of the invention is to provide a dispensing apparatus especially designed for use in café's, restaurants and similar places and having the general out-line and configuration of a hen in the act of setting, the construction and relative disposition of the several parts being such that when an operating lever is depressed an egg will be deposited at the rear of the nest and in position to be conveniently removed by the operator.

A further object of the invention is to provide a hollow body portion or receptacle adapted to receive the eggs or other articles to be dispensed and provided with movable sections constituting the head and tail of the fowl, said body portion being provided with pivoted doors or closures movable to open position to permit the discharge of a single egg at each operation of the device.

A further object is to provide means for tilting the head and tail sections and simultaneously actuating a motor thereby to produce a sound resembling the cackle of a hen.

A further object is to provide an escapement or delivery mechanism to effect the discharge of a single egg when the pivoted closures are moved to open position and further to provide means for feeding the eggs to the delivering mechanism.

Further objects and advantages will appear in the following description, it being understood that various changes in form, proportions and minor details of construction may be resorted to within the scope of the appended claims.

Figure 6:
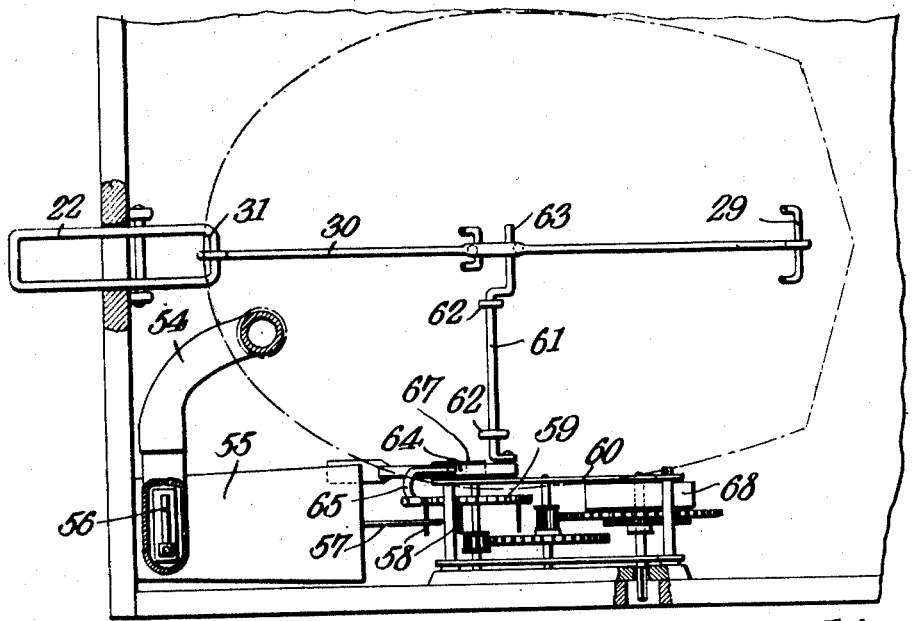
Figure 7:
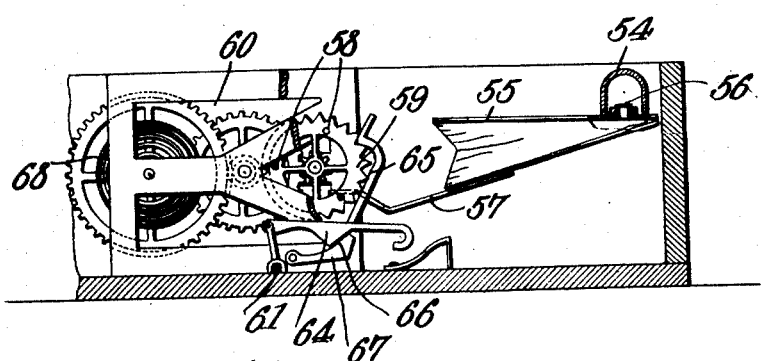

In the accompanying drawings forming a part of this specification: Figure 1 is a side elevation partly in section of a dispensing device constructed in accordance with my invention. Fig. 2 is a rear elevation of the same. Fig. 3 is a similar view showing the pivoted doors or closures moved to open position thereby to permit the discharge of an egg. Fig. 4 is a longitudinal sectional view of Fig. 1. Fig. 5 is a bottom plan view. Fig. 6 is a similar view showing the position of the motor for actuating the sounding device. Fig. 7 is a side elevation of the motor.

Similar numerals of reference indicate corresponding parts in all of the figures of the drawings.

The improved dispensing mechanism is principally designed for use in café's, restaurants and similar places for dispensing eggs and other commodities, and is preferably in the form of a fowl sitting on a nest and apparently in the act of laying eggs.

The device consists of a hollow body portion or casing 5 preferably stamped or otherwise formed of metal and having the general out-line and configuration of a fowl, said body portion being provided with pivoted sections 6 and 7 constituting the head and tail portions of the fowl. The tail portion 7 forms a cover or closure for the casing and is provided with laterally extending pins or trunnions 8 which engage correspondingly shaped sockets formed in the body portion and by means of which the section 7 is pivotally united to said body portion so that the same may be swung upwardly to permit the introduction of the eggs or other articles to be dispensed. The head section 6 is also pivotally mounted on the body portion, as indicated at 9 whereby said section is free to tilt rearwardly in the manner hereinafter explained. The body portion 5 is secured in any suitable manner to a box or receptacle 10 which constitutes a nest, the latter being lined with burlap or other suitable material to represent straw and also to prevent injury to the eggs when the latter are deposited in the nest.

The casing or body portion is provided with a transverse diaphragm or platform 11 preferably inclined toward a discharge opening 12 formed in the rear end of the body portion so as to assist in feeding the eggs to said opening. The lower end of the diaphragm or platform 11 is substantially semi-circular in shape, as indicated at 13 and extending inwardly from the opening 12 at the concaved portion of the diaphragm is a hood or cover 14 of a size to receive a single egg.

Secured to the hood 14 and spaced from the adjacent end of the body portion at the opening 12 are plates 15 which form compartments or chambers for a pair of laterally swinging doors 16 carried by a vertically movable member or yoke 17. The side bars of the yoke 17 are connected by a transverse bar 18 forming a guide-way for the reception of the laterally extending heads 19 of connecting links 20, the latter being pivotally secured to the adjacent ends of the doors, as indicated at 21. The yoke 17 is secured to the free end of the pivoted section 7 so that when an upward pressure is exerted on the yoke or lifting mechanism 17 the doors will be automatically moved to open position and the section 7 tilted upwardly.

Arranged beneath the diaphragm or platform 11 at the opening 12 is an escapement or delivery mechanism for presenting a single egg at said opening when the operating lever 22 is depressed. The delivery mechanism consists of a transverse rod 23 journaled in suitable bearings 24 secured to the bottom of a platform 11 and provided with angularly disposed arms 25 having laterally extending stop fingers 26 and 27 the free ends of which are curved upwardly and extend through suitable slots 28 formed in the platform, as best shown in Figs. 4 and 5 of the drawings. The rod 23 is provided with a depending loop 29 to which is connected an actuating rod 30, said rod forming a pivotal connection between the short arm 31 of the operating lever and the delivery mechanism. The stop finger 27 normally projects within the casing and in the path of movement of the eggs while the stop finger 26 extends beneath the platform and in position to engage and present the eggs successively to the opening 12 when the operating lever 22 is depressed. It will thus be seen that by depressing the lever 22 the doors 16 will be automatically opened and the stop finger 27 moved downwardly beneath the platform 11 while the finger 26 will move upwardly and thereby force the adjacent egg outwardly through the opening 12 into the nest.

Secured to the bottom of the platform 11 are depending hangers or supports 32 in which are journaled transverse operating shafts 33 provided with crank arms 34, said shafts being connected by suitable links 35 so that the same may move in unison.

Secured in any suitable manner to the crank arms 34 are one or more stirring blocks 36 which constitute the feeding mechanism for presenting the eggs to the delivery means.

The blocks 36 are provided with lugs or projections 37 which extend through suitable slots 38 formed in the platform 11 and may be covered with felt or other yieldable material so as to prevent cracking or otherwise injuring the eggs, when the feeding mechanism is operated.

Suitable hangers 39 are secured to the bottom of the platform at the opposite ends of the blocks 36 said hangers having their free ends bent laterally to form flanges or projections 40 which serve to limit the downward movement of the stirring blocks or bars.

Extending laterally from one of the crank shafts 34 are spaced parallel arms 41 and connected with the free ends of said arms are rods 42 which pass through suitable openings 43 in the adjacent portion of the platform 11 and constitute the mechanism for tilting the head section 6. The upper ends of the rods 42 are pivotally secured at 44 to a movable member 45 constituting the beak of the fowl. The beak 45 is pivoted at 46 to the head sections 6 so that the initial upward movement of the rods 42 will first tilt the head laterally and a further movement of the rod cause the beak to be forced downwardly to open position, as clearly illustrated in Fig. 4 of the drawings.

Depending from the shaft 33 is a loop 47 which extends in the path of movement of a tappet 48 carried by the actuating rod 30 so that when the lever 22 is depressed and the tappet 48 engages the loop 47 said loop will oscillate the rock shaft 34 to actuate the feeding mechanism and at the same time through the medium of the arms 41 and rods 42 tilt the head section and cause the beak 45 to open. The loop 47 embraces the rod 30 and normally bears against a stop lug 49 secured to and depending from the actuating rod. The arms 50 of the lifting mechanism or yoke 17 extend through suitable openings 51 formed in the platform 11 and are thence bent laterally and provided with alined terminal loops 52 which receive the adjacent ends of a transverse bar 53 secured to and carried by the stop finger 26 of the delivery mechanism. It will thus be seen that when the actuating rod 30 is moved in the direction of the arrow indicated in Fig. 1 of the drawings the stop finger 26 will be moved upwardly within the casing or body portion carrying with it the shaft or rod 53 which by engagement with the walls of the loops 52 will move the yoke or lifting mechanism in a vertical plane and simultaneously open the doors 16 and tilt the section 7 upwardly.

Arranged within the body portion and opening through the head section 6 is a flexible tube or pipe 54 the lower end of which projects through the platform 11 and communicates with a bellows 55 mounted in any suitable manner in one corner of the box or nest 10, said bellows being provided with a musical reed 56 so that when the bellows is compressed the air will be forced through the tube 54 and thus produce a sound resembling the cackle of a hen.

Secured to and projecting laterally from the bellows 55 is a rod 57 which engages suitable pins or lugs 58 projecting from a gear wheel 59 of a spring motor 60. As a means for actuating the motor thereby to sound the reed there is provided a rod 61 journaled in suitable bearings 62 on the base of the nest 10 and having one end provided with a crank arm 63 which extends in the path of movement of the tappet 48.

The opposite end of the rod 61 is connected to a pawl 64 carrying a brake rod 65 adapted to engage the teeth of the gear wheel 59. The pawl 64 is provided with a cam face 66 which engages the correspondingly inclined face of a lug 67 secured to one side of the motor casing 60. It will thus be seen that when the tappet 48 engages the crank arm 63 the latter will be tilted and through the medium of the pawl 64 disengage the brake 65 from the gear wheel 59, thus causing the spring 68 to actuate the motor. As the gear wheel 69 rotates the rod 57 will engage the pins 58 and thus compress the bellows and actuate the reed. As soon as the operating lever 22 is released the pawl 64 will return by gravity to inoperative position thereby moving the brake into engagement with the gear wheel 59 and automatically stopping the motor.

The operation of the device is as follows: Under normal conditions the operating mechanism is in the position shown in Fig. 1 of the drawings. If it is desired to obtain one or more eggs from the casing the operator depresses the lever 22 which moves the actuating rod 30 in the direction indicated by the arrow in Fig. 1 of the drawings thus exerting a forward pressure on the loop 29 which lowers the stop finger 27 so as to permit the passage of a single egg to the opening 12 and elevates the stop finger 26 thereby to prevent additional eggs from being discharged through the opening while the pivoted doors 16 are open. As the stop finger 26 is moved upwardly within the casing the rods 53 being in engagement with the walls of the loop 52 elevate the yoke or lifting device 17 and through the medium of the links 20 move the doors to open position to permit the discharge of the egg, the tail section 7 of the body portion by reason of its connection with the yoke 17 being at the same time tilted on its pivotal axis 8. As the rod 30 is moved longitudinally in the direction of the arrow in Fig. 1 the tappet 48 will engage the loop 47 and thus actuate the stirring bars 26 of the feeding mechanism so as to present an additional egg at the hood 14 for delivery to the opening 12 when the operating lever 22 is again depressed. The movement of the loop 47 imparts a tilting movement to the arms 41 and through the agency of the rods 42 tilts the head sections 6 rearwardly and subsequently opens the beak 45. Just before the tappet 48 engages the loop 47 it presses against the crank arm 63 of the trip rod 61 thus starting the motor in operation so that the sounding device will be actuated to produce a cackle at the same time the head section 6 is tilted rearwardly. When the operating lever 22 is released the lifting mechanism or yoke 17 will return by gravity to normal position thus automatically closing the doors 16 and causing the actuating rod 30 to disengage the tappet 48 from engagement with the loop 47 and crank arm 63 so that the motor will be stopped and the head section 6 returned by its own weight to normal position with the beak closed.

While the device is especially designed to be operated manually by depressing the lever 22 it is obvious that the same may be operated with slight changes in construction by the weight of a coin or other suitable check, as in an ordinary vending machine.

From the foregoing description it is though that the construction and operation of the device will be readily understood by those skilled in the art and further description thereof is deemed unnecessary.

Having thus described the invention what is claimed is:

1. In a dispensing device, a casing adapted to contain the articles to be dispensed and provided with a discharge opening, delivering mechanism for successively presenting the articles at the discharge opening, feeding mechanism cooperating with the delivering mechanism, an actuating member common to both the feeding and delivering mechanism, and a sounding device operable by the actuating member when the articles are presented to the discharge opening.

2. In a dispensing device, a casing adapted to contain the articles to be dispensed and provided with a discharge opening, delivering mechanism for successively presenting the articles at said opening, feeding mechanism, an actuating rod common to both, a movable closure operatively connected with the actuating rod, a sounding device, and means carried by the actuating rod for operating the sounding device when the articles are presented at the discharge opening.

3. In a dispensing device, a casing adapted to contain the articles to be dispensed and provided with a discharge opening, an inclined diaphragm arranged within the casing, delivering mechanism extending through the diaphragm for successively presenting the articles at the discharge opening, feeding mechanism, an actuating rod common both to the delivery and feed mechanism, and means for actuating the rod.

4. In a dispensing device a casing adapted to contain the articles to be dispensed and provided with a discharge opening, pivoted doors normally closing said opening and movable laterally in opposite directions to open position, a diaphragm arranged within the casing and provided with spaced recesses, delivering mechanism extended through the diaphragm for successively presenting the articles at the discharge opening, feeding mechanism operable within the recesses in the diaphragm, an actuating rod operatively connected with the pivoted doors and common to the feeding and delivering mechanism, and means for operating the rod.

5. In a dispensing device, a casing adapted to contain the articles to be dispensed and provided with a discharge opening, a diaphragm disposed within the casing, delivering mechanism extending through the diaphragm for successively presenting the articles to the discharge opening, feeding mechanism movable through the diaphragm, an actuating rod operatively connected with the delivering mechanism, a loop forming a part of the feeding mechanism, and a tappet carried by the actuating rod and adapted to engage the loop for simultaneously operating the feeding and delivering mechanism.

6. In a dispensing device, a casing adapted to contain the articles to be dispensed and having a discharge opening, a diaphragm arranged within the casing, delivering mechanism including oppositely disposed stop fingers extending through the diaphragm for successively presenting the articles at the discharge opening, feeding mechanism, an actuating rod operatively connected with the delivering mechanism, a loop forming a part of the feeding mechanism, and a tappet carried by the actuating rod and adapted to engage the loop for simultaneously operating the feeding and delivering mechanism.

7. In a dispensing device, a casing adapted to contain the articles to be dispensed and provided with a discharge opening, delivering mechanism for successively presenting the articles at the discharge opening, feeding mechanism, an actuating rod operatively connected with the delivering mechanism and provided with a tappet adapted to engage and actuate the feeding mechanism, and an audible signal, a trip arm extending laterally from the signal and arranged in the path of movement of the tappet thereby to sound the signal when the rod is actuated.

8. In a dispensing device, a casing including pivotally united sections and provided with a discharge opening, delivering mechanism for successively presenting an article at the discharge opening, a sounding device, and means for actuating the delivering and sounding mechanism and simultaneously tilting the casing sections.

9. In a dispensing apparatus, a casing having a discharge opening and provided with pivotally united sections, a sounding device, means for successively presenting an article at the discharge opening, and means for simultaneously actuating the delivering mechanism and sounding device and tilting the pivoted sections of the casing when the articles are presented at the discharge opening.

10. In a dispensing device, casing having a discharge opening and provided with pivoted sections, doors for normally closing the discharge opening, delivering mechanism for successively presenting an article to the discharge opening when the doors are in open position, means for actuating the delivering mechanism and simultaneously tilting the sections of the casing, and a sounding device operable by engagement with the delivery actuating means.

11. In a dispensing device, a casing having a discharge opening and provided with pivoted sections, an inclined diaphragm arranged within the casing, delivering mechanism extending through the diaphragm for successively presenting an article at the discharge opening, feeding mechanism disposed beneath the diaphragm and operable within the casing, a sounding device, an actuating rod common to the feeding and delivering mechanism and operatively connected with the pivoted sections for tilting the latter when the delivering mechanism is operated, and a tappet carried by the actuating rod and adapted to engage the sounding device.

12. In a dispensing device, a casing having a discharge orifice and provided with pivoted sections, a hood disposed at the discharge opening, delivering mechanism disposed beneath the hood for successively presenting an article at the discharge opening, closures operatively connected with the delivering mechanism, a sounding device, and an actuating rod for operating the sounding device and delivering mechanism and simultaneously tilting the sections of the casing.

13. In a dispensing device, a casing having a discharge opening and provided with pivoted sections, delivering mechanism for successively presenting an article at the discharge opening, a vertically movable yoke operatively connected with the delivering mechanism, doors mounted for swinging movement on the yoke and forming a closure for the discharge opening, said yoke being operatively connected with one of the movable sections of the casing, feeding mechanism, arms carried by the feeding mechanism, a rod forming a connection between the arms and an adjacent pivoted section of the casing, a sounding device, an actuating rod operatively connected with the delivering mechanism and extending in the path of the feeding mechanism for operating the same, and a tappet carried by the actuating rod and adapted to operate the sounding device.

In testimony that we claim the foregoing as our own, we have hereto affixed our signatures in the presence of two witnesses.

GUSTAF A. ALMSTROM.
PETER CHRISTENSON.

Witnesses:
ALGOT JOHNSON,
ROBINSON P. BRIGGS.